(No Model.)

L. P. COTTLE.
SPOON AND LADLE.

No. 249,459.

Patented Nov. 15, 1881.

Witnesses:
J. E. Raeph.
Ed S. Marsden.

Inventor
Latitia Philips Cottle
Per Charles F. Nash
Attorney

UNITED STATES PATENT OFFICE.

LATITIA P. COTTLE, OF WOODSTOCK, ONTARIO, CANADA.

SPOON AND LADLE.

SPECIFICATION forming part of Letters Patent No. 249,459, dated November 15, 1881.

Application filed April 25, 1881. (No model.)

*To all whom it may concern:*

Be it known that I, LATITIA PHELIPS COTTLE, a subject of Great Britain, residing at Woodstock, in the county of Oxford, province of Ontario, and Dominion of Canada, have invented certain new and useful Improvements in Spoons for Table and Culinary Purposes, of which the following is a full, clear, and exact description, which will enable others skilled in the art to make and use the same, reference being had to the accompanying drawings, forming part of this specification.

Figure 1:
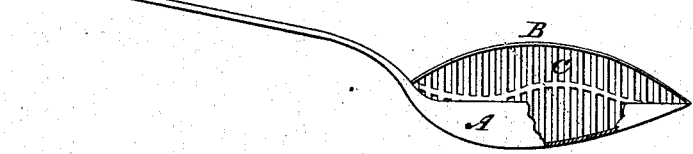
Figure 2:
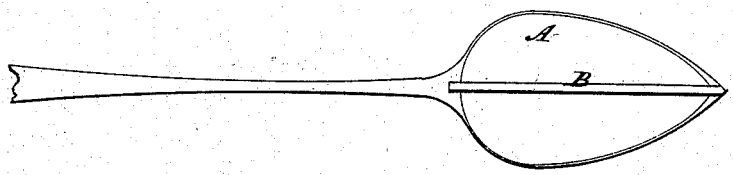

Figure 1 represents a side view of a spoon, part being broken away to illustrate the invention. Fig. 2 is a plan of the same.

The object of this invention is to construct a spoon or ladle which can be effectively used for skimming and straining, the bowl being made or provided with a central partition running lengthwise, said partition standing upright in the bowl and having numerous apertures of any desired size or shape, so as to allow a free passage for all liquid matter and retard all fatty or solid matter.

In the case here presented, A represents the bowl of the spoon, and B a partition dividing the same lengthwise. The said central partition is not made solid, but has a series of vertical slots, C, which allows all liquid matter to pass freely from one side to the other, but will retard and hold back all fatty or solid matter; consequently will be invaluable as a gravy-spoon, as the fatty portion of the gravy usually hardens very rapidly in the dish.

I do not limit myself to the construction of vertical openings in the central partition; neither do I desire to limit myself to a gravy-spoon, as I also propose applying the use of a centrally perforated divisional plate, as above described, to ladles and culinary utensils, and have the same cut or stamped with any size, number, or shape of apertures best suited for the uses and purposes it may be applied to.

Having thus described my invention, what I claim as new, and desire to secure by Letters Patent, is—

As a new article of manufacture, the spoon A, with central partition, B, provided with a series of slots or openings, C, the same being constructed and arranged in the manner and for the uses and purposes described.

Dated January 19, 1881.

LATITIA PHELIPS COTTLE.

Witnesses:
G. M. COTTLE,
E. J. COTTLE.